May 17, 1966

C. E. GUTHRIE 3,251,645

METHOD FOR PROCESSING ALUMINUM-CONTAINING NUCLEAR FUELS

Filed March 31, 1964

INVENTOR.
Charles E. Guthrie
BY Roland A. Anderson
ATTORNEY.

United States Patent Office 3,251,645
Patented May 17, 1966

3,251,645
METHOD FOR PROCESSING ALUMINUM-CONTAINING NUCLEAR FUELS
Charles E. Guthrie, Oak Ridge, Tenn., assignor to the United States of America as represented by the United States Atomic Energy Commission
Filed Mar. 31, 1964, Ser. No. 356,339
4 Claims. (Cl. 23—14.5)

The present invention relates, generally, to methods for processing spent nuclear fuels and more particularly to an improved method for dissolving aluminum-containing nuclear fuels.

Heretofore, dissolution of aluminum-containing nuclear fuels has, generally, been directed toward aqueous dissolution methods where the fuel material, such as uranium, plutonium, and other useful materials, was dissolved in strong aqueous acids, extracted with an organic solvent and subsequently separated and recovered. Equally applicable, where the fuels were clad with aluminum, was a reprocessing operation in which the cladding was first dissolved with a caustic solution of sodium hydroxide and sodium nitrate, and then the fuel core was dissolved and the fuel values separated and recovered as above. Also, where the cladding is not bonded to the fuel core the cladding may be mechanically removed and the fuel core dissolved as above.

While certain molten salt solvents have generally proven suitable for dissolving spent nuclear fuels clad with zirconium, they have not appeared too attractive for aluminum-containing dissolution processes due to the highly developed and highly suitable aqueous dissolution processes. This is especially true when evaluated in light of the potential corrosion problem of the dissolver vessel under operating conditions. While these salts are not intrinsically corrosive, by the addition of hydrogen fluoride to the system at elevated temperatures corrosive attack on the vessel metals becomes a problem. With the advent of an increased number of aluminum-containing fuels, it is desirable to find a suitable molten salt solvent for the dissolution of these types of nuclear fuels.

Co-pending application Serial No. 356,338, filed of even date with this application in the names of Roy E. Thoma et al. for "Method for Processing Aluminum-Containing Nuclear Fuels," discloses a method for dissolving aluminum-containing nuclear fuels by contacting the fuels with a molten fluoride salt solvent of $KF-ZrF_4$. There, in a preferred method for carrying out the invention, the fuels are dissolved by adding KF intermittently to the system to maintain the temperature of the melt below 600° C. and to increase the salt capacity for dissolved aluminum fluoride. While this step-wise dissolution substantially increased the capacity of the salt solvent, it required that both the salt dilution and the quantity of aluminum which the new salt composition was capable of dissolving without exceeding 600° C. be calculated for each step. Further, during the dissolution a sludge was formed which required continued hydrofluorination after the aluminum dissolution was completed to convert the Zr powder back to the soluble tetrafluoride. While the aforementioned method provided for the dissolution of such nuclear fuels with good dissolution rates and high salt capacity, certain problems remained as to carrying out the process.

It is, therefore, a general object of the present invention to provide an improved method for dissolving aluminum-containing nuclear fuels.

Another object is to provide an economical and simplified process for the dissolution of aluminum-containing nuclear fuels.

A further object is to provide an improved method for dissolving such fuels wherein the dissolution is effected without any sludge formation.

Other objects and advantages of this invention will become apparent from the following detailed description thereof when read in conjunction with the accompanying drawings, in which.

In accordance with the present invention, aluminum-containing nuclear fuels are processed by dissolving them in a molten salt solvent of substantially $$67KF-21ZrF_4-12AlF_3$$

mole percent at a temperature no greater than 600° C. while passing anhydrous hydrogen fluoride through the melt. When the salt capacity for aluminum fluoride reaches about 32 mole percent, and without exceeding a melt temperature of 600° C., fluorine gas is passed through the melt while maintaining a melt temperature at about 600° C. to convert the dissolved fuel values to the volatile hexafluoride. The a portion of the salt melt is discarded and KF and $2KF \cdot ZrF_4$ salts are added to the remaining melt to change the composition of the new melt back to the original salt composition of substantially $67KF-21ZrF_4-12AlF_3$.

Figure 1:
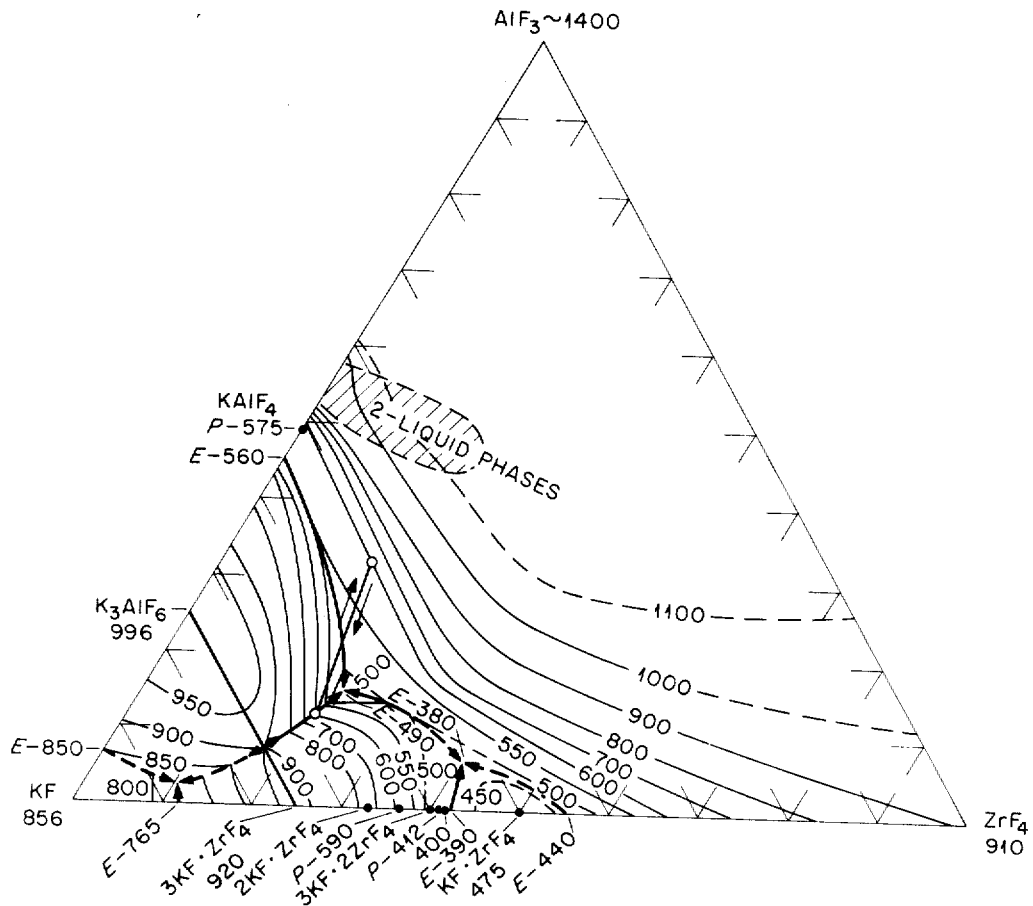
FIGURE 1 is the phase diagram for the ternary system $KF-ZrF_4-AlF_3$ showing a preferred embodiment of the present invention.

In this manner and in a preferred embodiment as shown in FIG. 1 dissolution of aluminum-containing nuclear fuels was effected by oscillating between 12 and 32 mole percent aluminum fluoride. Inasmuch as the same weight of sample, salt discard, and salt dilution was used each time, this method afforded a simplified operation with excellent process control. Unexpectedly, essentially no sludge formed making this method well suited for large-scale operations. Dissolution rates ranging from 8 mils/hr. at 12 mole percent aluminum fluoride to 45 mils/hr. at 32 mole percent aluminum fluoride were achieved.

In preparing the salt bath it is essential that the salt solvent not only have an initial composition of substantially $67KF-21ZrF_4-12AlF_3$ but also that it be of sufficient quantity to dissolve all the aluminum present during each run without exceeding 32 mole percent aluminum fluoride. As a preliminary step to the dissolution the total aluminum content of the fuel elements which the dissolver can accommodate per run is calculated and the quantity of salt which will hold all the aluminum which is present in the fuel elements without exceeding 32 mole percent aluminum fluoride is determined. After the quantity of salt has been calculated, the salt melt is prepared by adding suitable quantities of KF and $AlF_3$ salts to a commercially available salt compound $2KF \cdot ZrF_4$ to give the initial salt composition of $67KF-21ZrF_4-12AlF_3$.

The salt solvent may be treated by bubbling anhydrous hydrogen fluoride through the melt during the heating step; this is to drive off any oxides and moisture present and also to saturate the salt mixture with hydrogen fluoride prior to the dissolution operation. Further, continued sparging of the molten salt solvent with anhydrous hydrogen fluoride during dissolution has been found to be essential to achieving high dissolution rates.

Due to the corrosive nature of the molten fluoride salt under operating conditions, the dissolver should be constructed of a structural material which has good corrosion resistance to such salts; construction materials disclosed in the aforementioned co-pending Thoma et al. application, such as INOR-8, have been found to be quite suitable.

When the first cycle of the dissolution is completed, i.e., when the aluminum fluoride composition reaches 32 mole percent, the dissolved fuel value, such as uranium, is removed from the salt melt, which is maintained at a temperature at about 600° C., by passing fluorine gas through the melt to convert the soluble uranium tetrafluoride to the volatile uranium hexafluoride. The volatilized uranium hexafluoride product is subsequently purified by an absorption-desorption cycle on sodium fluoride pellets and is collected in cold traps. At this point a portion of the salt melt is discarded and suitable quantities of KF and $2KF \cdot ZrF_4$ salts are added to the remaining salt melt to change the salt composition back to the original composition of $67KF-21ZrF_4-12AlF_3$. Then the dissolution cycle may then be repeated with a new batch of fuel elements.

Figure 2:
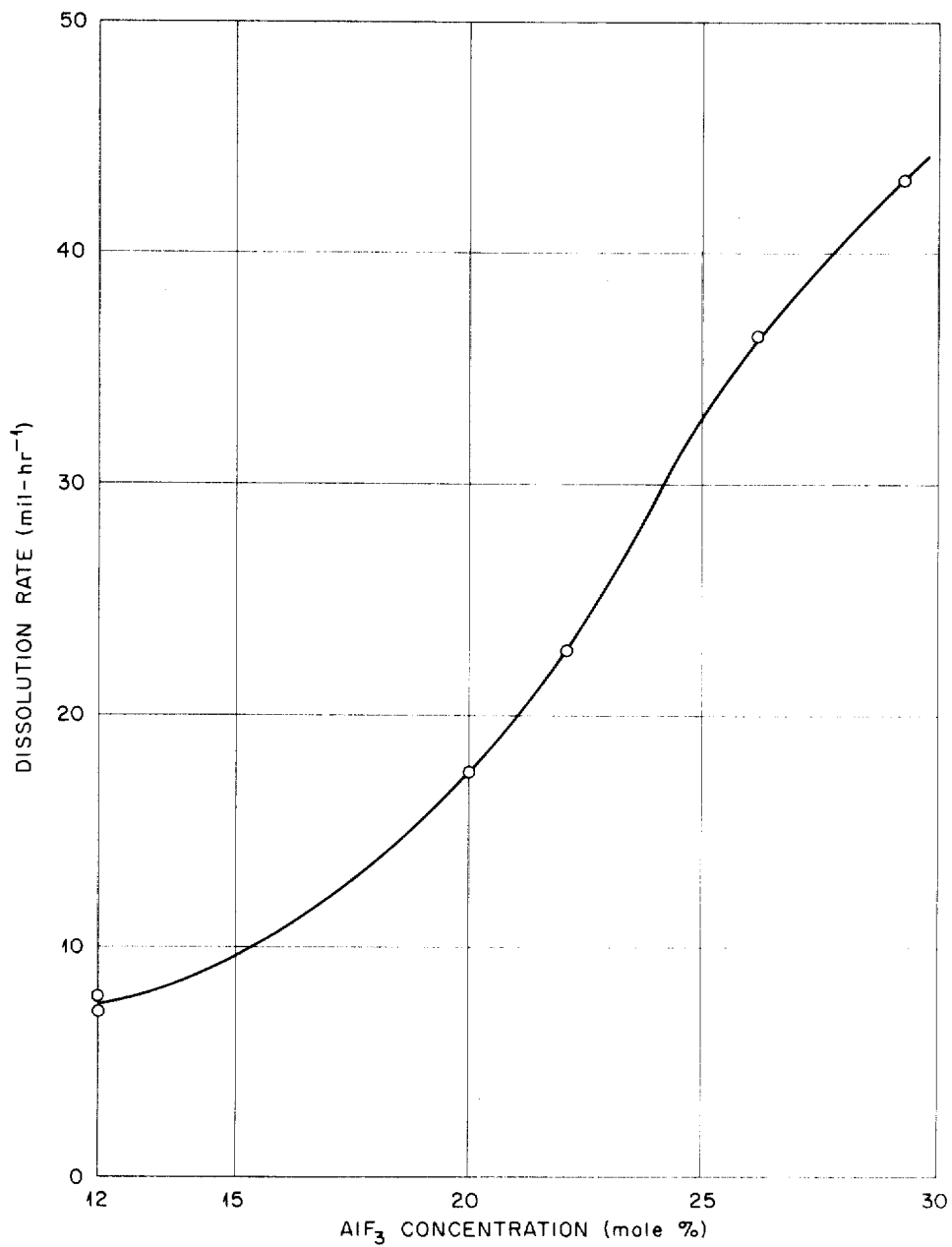
FIGURE 2 is a plot of aluminum fluoride concentration versus aluminum dissolution rate for the system $KF-ZrF_4-AlF_3$.

Normally, it is expected that the rate of dissolution will decrease as the solution becomes saturated with respect to the dissolving element or compound. However, applicant has found that the dissolution rate, as illustrated in FIG. 2, is unique in that the rate increases with aluminum fluoride concentration. No complete explanation for this phenomenon is known. It is generally advanced that dissolution by hydrogen fluoride in a molten salt occurs in three steps as follows: (1) hydrogen fluoride heterogeneous dissolution in which gaseous HF reacts with a solid surface to form a fluoride which is subsequently removed to make way for further gas-to-surface reaction, (2) hydrogen fluoride soluble phase dissolution in which the solubility of HF in the salt melt implements the dissolution rate, and (3) dissolution as the result of the combination of the above-mentioned mechanisms. It is postulated that the dissolution rate increases as aluminum fluoride concentration increases due to some unknown occurrence which increases the HF solubility in the salt melt. This may come about due to the changing ratio of aluminum to zirconium or may result from a change in activities; in any event, applicant does not wish to be bound by any particular theory as to the mechanism by which the dissolution proceeds.

As disclosed in the aforementioned co-pending Thoma et al. application, the dissolution proceeds partly by a metathesis-type reaction between the Al and the $ZrF_4$ resulting in a sludge formation which was thought to be due to Zr reduction and which required continued hydrofluorination after the aluminum dissolution was completed to convert the Zr powder back to the tetrafluoride. Applicant has found that, when the salt composition of $67KF-21ZrF_4-12AlF_3$ was used as the salt solvent for carrying out the dissolution in accordance with the present invention, essentially no sludge formation occurred, and it is believed that this is due to the fact that essentially no Zr reduction takes place.

Further illustration of the quantitative aspects and procedures of the present invention is provided in the following examples. Example I demonstrates the applicability of the present salt solvent in dissolving aluminum-uranium alloy fuel elements and also the integration of such a process with a fuel separation and recovery process. It further illustrates a preferred method of carrying out the invention.

Example I

A molten fluoride salt bath was prepared by adding approximately 53 grams of a salt mixture having an initial composition of $67KF-21ZrF_4-12AlF_3$ (mole percent) to a cylindrical nickel reactor vessel, 1 inch by 8 inches long and heating the contents to a temperature of 600° C. while bubbling anhydrous hydrogen fluoride through the melt to remove any moisture and oxides present and to saturate the salt. The salt mixture (total of 52.8 grams) was prepared by adding 9.4 grams of KF and 6.0 grams of $AlF_3$ to 37.4 grams of the compound $2KF \cdot ZrF_4$ to provide the initial salt composition $67KF-21ZrF_4-12AlF_3$.

Two aluminum-uranium alloy plates (¼″ x ⁵⁄₁₆″ x 0.005″), which contained approximately 3.6 weight percent uranium, were immersed in the salt bath while passing anhydrous hydrogen fluoride at a flow rate of approximately 100 cc./min. through the melt. In order to operate in an oscillating fashion between 12 and 32 mole percent aluminum fluoride, it was necessary, when the aluminium fluoride composition reached 32 mole percent to (1) remove the dissolved uranium by passing fluorine gas through the melt to volatilize the uranium, (2) discard a portion of the salt melt, and (3) add $2KF \cdot ZrF_4$ and KF salts to the remaining salt melt to change the composition of the melt back to the original composition of $$67KF-21ZrF_4-12AlF_3$$

(mole percent). In this manner, the dissolution could be repeated using the same quantities of salt discard and salt addition.

The volatilized uranium hexafluoride product was subsequently recovered by cooling it to a temperature of about 100° C. and absorbing it on a bed of sodium fluoride pellets to separate the fuel value from its fission products. Then the temperature of the bed was raised to a temperature of about 400° C. to remove the absorbed uranium hexafluoride to further decontaminate the fuel value from its fission products and thereafter the purified uranium hexafluoride product was collected in cold traps. The results are shown in Table I.

TABLE I.—DISSOLUTION OF Al-U ALLOY SPECIMENS IN $KF-ZrF_4-AlF_3$ WITH HF

| Phase I: | Run No. 1 |
| --- | --- |
| Specimen dimensions, in. | 2¼ x ⁵⁄₁₆ x 0.005 |
| Initial salt weight, g. | 52.8 |
| Initial salt composition, mole percent $KF-ZrF_4-AlF_3$ | 67-21-12 |
| Weight of Al (fuel element) added, g. (est. 3.6 wt. percent U) | 4.7 |
| Salt temperature, ° C. | 600 |
| HF flow, cc. min.⁻¹ | ~100 |
| Final salt weight, g. | 65.5 |
| Final salt composition, mole percent $KF-ZrF_4-AlF_3-UF_4$ | 51.8-16.2-32-0.06 |
| Phase II, recovery of U as $UF_6$ by volatilization with $F_2$ gas: | |
| Temperature, ° C. | 575 |
| $F_2$ flow rate, cc. min.⁻¹ | ~100 |
| U recovered | 99.4 |
| Phase III: | |
| Discard from melt, g. | 46.5 |
| Wt. of final melt remaining, g. (comp. 51.8-16.2-32*) | 19.1 |
| Salt additions— | |
| $2KF-ZrF_4$, g. | 26.6 |
| KF, g. | 5.5 |
| Weight of new melt, g. | 51.2 |
| Final salt composition, mole percent $KF-ZrF_4-AlF_3$ | 67-21-12 |

*Uranium concentration in the salt melt after fluorination was in PPM.

Example II shows the rates of dissolution for various salt baths having an aluminum fluoride composition ranging between 12 and 32 mole percent.

Example II

The same procedure employed in Example I was used to prepare various molten salt baths having an aluminum composition ranging from 12 to 32 mole percent. The rate of dissolution for each composition was obtained by dissolving an aluminum specimen, 0.312 inch diameter by 1 inch long, in each of the salt compositions for one hour at 600° C. and measuring the amount dissolved gravimetrically. The surface area of the aluminum specimen was calculated to be 7.4 cm.². Anhydrous hydrogen fluoride was bubbled through each melt at the rate of 100 cc./min. The results are shown in Table II and are illustrated graphically in FIG. 2.

TABLE II.—DISSOLUTION RATES OF ALUMINUM IN KF-ZrF$_4$-AlF$_3$ WITH HF

| Run | KF-ZrF$_4$-AlF$_3$, mole percent | Aluminum specimens Wt. loss, g. | Dissolution Rate, Mil.-hr.$^{-1}$ |
|---|---|---|---|
| 1 | 67–21–12 | 0.3892 | 7.8 |
| 2 | 63.5–19.5–17 | 0.822 | 16.5 |
| 3 | 59.5–18.5–22.0 | 1.1507 | 22.8 |
| 4 | 57–17–26 | 1.8155 | 36.2 |
| 5 | 54.5–16.5–29 | 2.1505 | 42.6 |

What is claimed is:

1. An improved method for processing aluminum-containing nuclear fuels comprising the steps of dissolving said nuclear fuels in a molten salt solvent of substantially 67KF-21ZrF$_4$-12AlF$_3$ mole percent until no greater than 32 mole percent aluminum fluoride is dissolved while maintaining a melt temperature of below about 600° C., said dissolution being carried out at a temperature no greater than 600° C. and while passing anhydrous hydrogen fluoride through the melt, then passing fluorine gas through said melt while maintaining the temperature of said melt at about 600° C. to convert the dissolved fuel values to the volatile hexafluoride, thereafter discarding a portion of said melt and adding KF and 2KF·ZrF$_4$ salts to the remaining salt melt to thereby bring the composition of said salt melt back to said initial composition of substantially 67KF-21ZrF$_4$-12AlF$_3$.

2. The method of claim 1 wherein said aluminum-containing nuclear fuels consist of uranium and plutonium values.

3. The method of claim 1 wherein said fuel values consist of uranium.

4. The method of claim 3 wherein said volatile uranium hexafluoride is recovered by cooling said uranium hexafluoride to a temperature of about 100° C., absorbing said cooled product on a bed of sodium fluoride pellets to separate said fuel value from its fission products, heating said bed to a temperature of about 400° C. to remove said uranium hexafluoride from said bed, thereby further decontaminating said fuel value from its fission products, and thereafter recovering said purified uranium hexafluoride product.

No references cited.

LEON D. ROSDOL, *Primary Examiner.*

S. TRAUB, *Assistant Examiner.*